May 2, 1939.  A. I. EDDY  2,157,072
BATTERY ELECTRODE ELEMENT AND METHOD OF MAKING THE SAME
Filed Jan. 29, 1937  2 Sheets-Sheet 1
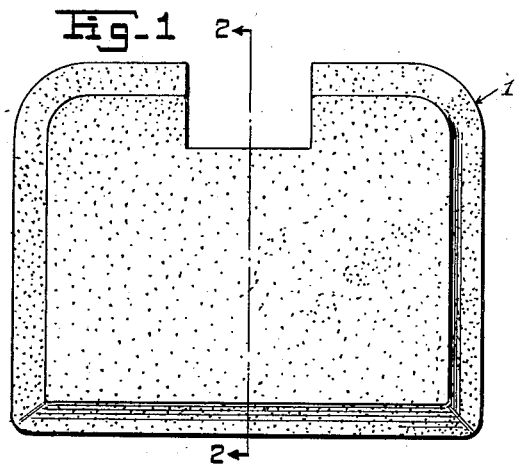
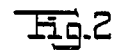
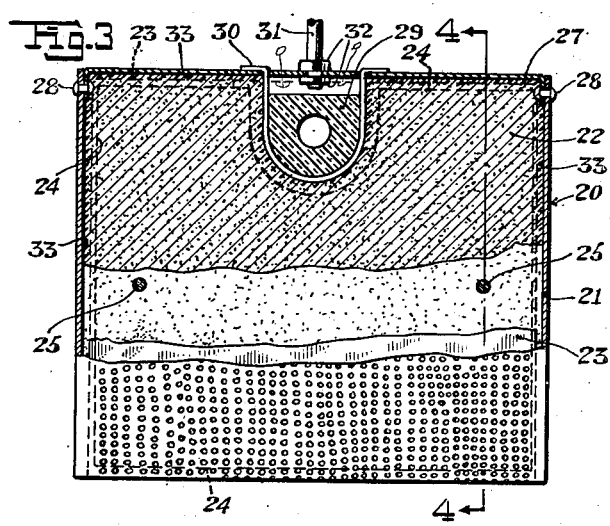
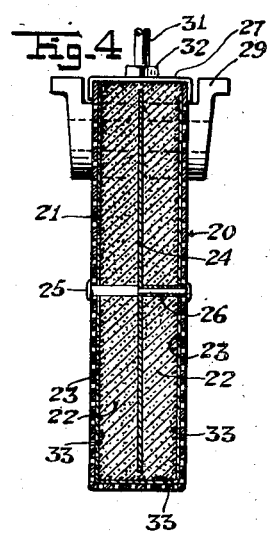
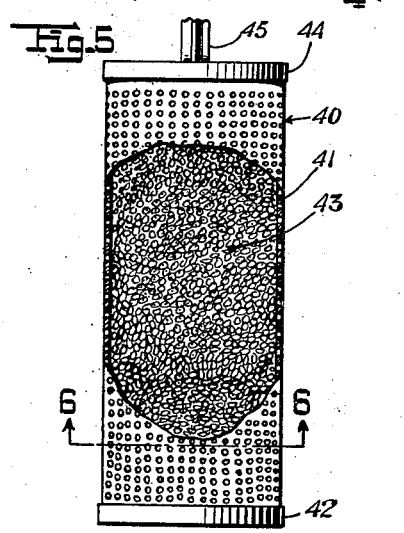
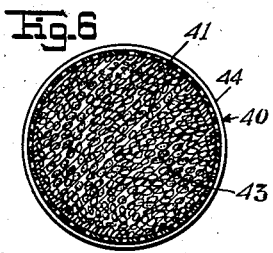
INVENTOR
Albert I. Eddy
BY Henry Lanahan
ATTORNEY May 2, 1939.  A. I. EDDY  2,157,072
BATTERY ELECTRODE ELEMENT AND METHOD OF MAKING THE SAME
Filed Jan. 29, 1937  2 Sheets-Sheet 2
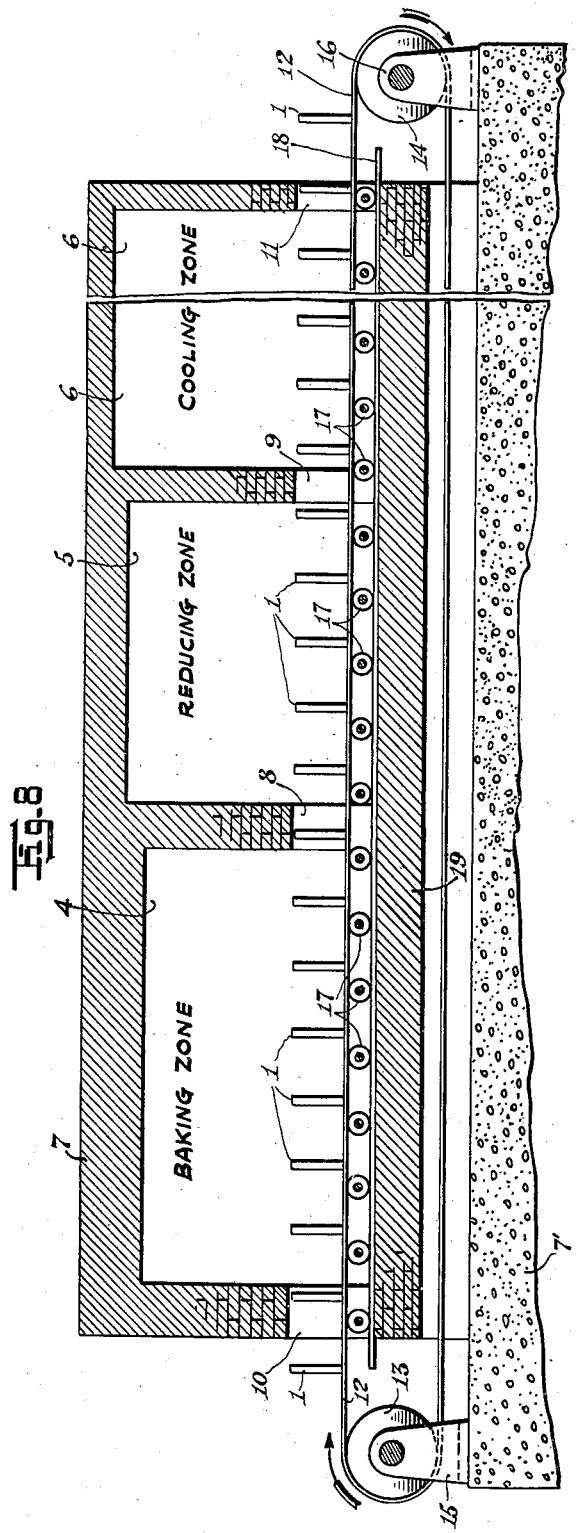
INVENTOR
Albert I. Eddy
BY Henry Lanahan
ATTORNEY Patented May 2, 1939

2,157,072

UNITED STATES PATENT OFFICE 2,157,072

BATTERY ELECTRODE ELEMENT AND METHOD OF MAKING THE SAME

Albert I. Eddy, Hillside, N. J., assignor to Thomas A. Edison, Incorporated, West Orange, N. J., a corporation of New Jersey Application January 29, 1937, Serial No. 122,894

19 Claims. (Cl. 136—117)

This invention relates to chemical depolarizing electrode elements adapted for use in various types of galvanic batteries or cells, including both primary and storage batteries, having in each case, as the chemical depolarizing material, suitable metal oxide such, for example, as lead oxide, manganese oxide, nickel oxide, copper oxide, etc. However, while not limited thereto, the invention is especially applicable to depolarizing electrode elements adapted for use in primary batteries of the type wherein a negative depolarizing electrode consisting of an element or elements including copper oxide as the chemical depolarizing material and a positive electrode consisting of an element or elements of zinc, are disposed in a caustic alkaline solution as the electrolyte. Accordingly, for purposes of illustration, the following description of the invention will be principally directed to the application thereof to depolarizing electrode elements designed for use in primary batteries of the type just referred to.

In primary batteries of the character above described, several different types of negative or depolarizing electrode elements are commonly employed. The most common type comprises a mass of finely divided copper oxide molded into the desired form (usually either a flat plate or a cylinder) and then suitably agglomerated to render the same comparatively hard and self sustaining. The self-sustaining member of copper oxide thus produced is embraced by or otherwise suitably connected with a conductive frame or support to form the completed element, and one or more of such elements when assembled in a battery, are connected to the positive pole of the battery.

There are also several "basket" types of such negative or depolarizing electrode elements which are used to a considerable extent. One of these types comprises a perforated conductive container adapted to be electrically connected to the positive pole of a battery, and a mass of finely divided copper oxide tightly packed in such container. The container is usually lined with paper or other suitable porous material to prevent escape of the small particles of copper oxide through the perforations of the container. To better maintain the mass of copper oxide in good conductive relation with the container, a thin metal sheet is usually embedded in said mass and is electrically connected to and supported from the walls of the container.

Another type of such "basket" elements comprises a finely perforated conductive container filled with a loose mass of small bodies or granules of copper oxide, the size of said granules preferably being such as to prevent their escape through the perforations in the container. In this case only the direct contact of the granules of copper oxide with the inner wall surfaces of the container is relied upon for maintaining the copper oxide mass and the container in proper conductive relation.

Copper oxide is, in itself, a very poor electrical conductor, and it is also soluble to a considerable extent in an alkaline solution, such as the electrolyte used in primary batteries of the character referred to above. It is important that in a depolarizing electrode element comprising a mass of copper oxide and designed for use in such a battery, provision be made for insuring good and sufficient conductivity between said mass and the conductive support or frame therefor upon initially closing the operating or working circuit of the battery in which the element may be disposed, so that said battery will supply current of substantially the full strength which it is designed to generate at the very start of the normal discharge operation thereof and so that the consumption or exhaustion of the depolarizing mass of copper oxide will progress uniformly throughout such discharge operation. It is also highly desirable to prevent the copper oxide of such elements from dissolving in the electrolye of the batteries in which the elements are used. While the copper oxide does not ordinarily dissolve to such an extent as to result in any material damage to the depolarizing or negative electrode elements, the amount thereof dissolved is, under certain conditions, such as to cause very material deterioration of the zinc or positive electrode elements and to seriously affect the service life of the battery. This is particularly true in the case of batteries used in services where the discharge rates are very low or the batteries are on open circuit for long periods as, for example, services in which the batteries are relied upon as a standby or a reserve source of power. Under these circumstances it is likely that such an amount of copper oxide will be dissolved in the electrolyte as to result in the deposition of a harmful quantity of copper on the zinc or positive electrode elements and thereby deterioration of the latter elements due to the ensuing local action which takes place.

To obtain the desired conductive relationship between the copper oxide and the supports therefor in electrode elements of the types herein described and to prevent dissolving of the copper oxide in the battery electrolyte, various expedients have heretofore been resorted to.

Where the electrode elements comprise self-sustaining members of agglomerated finely divided copper oxide, it is common practice, for the attainment of the results just mentioned, to provide such members with conductive coatings of metallic copper by reducing copper oxide at the surfaces of said members prior to the assembling of the elements in batteries. The usual method employed for accomplishing this result consists in "tumbling" such copper oxide elements or members in an electrolyte comprising a solution of caustic soda or a solution of a suitable acid and containing zinc dust. In the carrying out of this method local action is set up between the zinc and copper oxide at the surfaces of the electrode elements or members, the zinc dissolves and the oxide is reduced to metallic copper. While the surface layers or coatings of copper thus produced on the copper oxide elements or members are serviceable, they fall far short of being entirely satisfactory. But very thin surface coatings or films of copper can be thus obtained on the said members no matter how long the latter are "tumbled' in the electrolytic solution. The coatings thus produced are also far from being perfect uninterrupted layers of copper, due to the fact that the material at the surfaces of the copper oxide members is not completely reduced with the result that there remain present in the surface coatings produced a vast number of minute particles of unreduced copper oxide. A copper coating thus obtained is also spongy and fully as porous as the underlying copper oxide. A copper oxide depolarizing member on which such a coating is so produced therefore absorbs considerable liquid from the electrolyte solution, and as wetted cooper readily oxidizes upon being dried, considerable oxidation of the coating occurs when said member is removed from the solution and dried. Consequently the conductivity of the coating is greatly reduced and when the circuit of a battery equipped with such a coated member is closed, an appreciable amount of current is used in reducing the material at the surface of said member and some time elapses before the battery supplies the circuit with the full strength of current which it is designed to generate. Furthermore, as the electrolyte solution employed in this method is either acid or alkaline, acid or alkaline salts are deposited and entrained in the depolarizing members treated by such method. It is impossible to eliminate all of said salts even with prolonged washing or other treatment with suitable liquids. While the amount of these salts remaining in the depolarizing members after such treatment is not ruinous, it is sufficient to affect adversely the operation of batteries in which the depolarizing members are used. It is also apparent that the very thin and imperfect surface coatings of copper obtained on copper oxide depolarizing members by the method just described (hereinafter sometimes referred to as the "wet reduction method"), will be very ineffective in preventing the copper oxide of such members from dissolving in the electrolyte of batteries in which the members are used.

Another method which has been used for providing battery depolarizing metal oxide members with conductive surface layers or coatings which are also designed to prevent the dissolving of the underlying metal oxide, consists in spraying a suitable metal in molten condition on to such members. For example, where the depolarizing members are self-sustaining and consist of agglomerated copper oxide, such members have been provided with conductive coatings by spraying the same with molten copper. This method and the results obtained thereby, however, are open to several objections. The method is expensive and wasteful of the metal which is sprayed; it is practically impossible thereby to obtain on a depolarizing member, a surface layer or coating of the sprayed metal which is uniform or substantially uniform in thickness and other physical characteristics; and if sufficient metal is sprayed on to such a depolarizing member to obtain a conductive coating thereon of a thickness corresponding to the desired separation of or distance between the underlying depolarizing oxide material and the electrolyte of a battery in which the said member may be disposed, the coating will be so dense and compact as to seriously interfere with the proper performance of the battery.

For the purpose of providing a battery depolarizing member or mass of metal oxide with a conductive surface layer or coating of sufficient thickness to prevent any appreciable amount of the underlying oxide from being dissolved in the battery electrolyte, it has also been proposed to provide for an initial temporary discharge of a battery in which said member or mass is incorporated, and to maintain this discharge until the capacity of the oxide material has been used up to such an extent as to obtain on such member or mass a conductive coating of the desired thickness. According to this scheme means is provided for short-circuiting the battery immediately upon completion of the assembly thereof, such means including an element which is consumable in the discharge operation of the battery and which is relied upon automatically to break the short circuit after a predetermined period. There are at least two reasons why the use of this scheme is undesirable. In the first place, various attempts to use the same have demonstrated that the results obtained are not altogether satisfactory and that other troubles, such as faulty and non-uniform operation, are likely to arise because of the automatic character of the arrangement involved. Another objection, and probably a much more serious one, is that resort to this scheme results in a very appreciable portion of the battery electrolyte being used up or exhausted before the battery is put into service. The standard jars or containers for wet primary battery cells of the type under discussion, of which there are millions in service, are of sizes just sufficient for the electrolyte required in fully exhausting the active material of the battery electrodes, and when, as would often be the case if the said scheme were used, approximately 50 ampere hours of the capacity of a battery is used up in a manner which is wasted as far as the service life of the battery is concerned, there is liklihood of trouble developing late in the life of the battery due to an overconcentrated electrolyte.

One of the principal objects of this invention is to provide battery depolarizing members, masses or bodies of metal oxide, having improved conductive surface layers or coatings of such characteristics that the above described objections and disadvantages which obtain or are likely to obtain when such depolarizing members, masses r bodies are coated with conductive layers or films by any of the expedients heretofore commonly employed, are substantially obviated.

Another object of the invention is to provide such depolarizing members, masses or bodies having the said improved conductive coatings or surface layers formed in situ thereon and therefrom.

The invention also resides in novel methods for providing battery depolarizing members, masses or bodies of metal oxide with the said improved conductive coatings and for producing self-sustaining depolarizing members of metal oxide having such coatings.

Other objects and features of the invention will appear from the following description and the appended claims.

For a clearer understanding of the invention attention is directed to the drawings which accompany and form part of this specification, and in which:

Fig. 1 is a view in side elevation of a self-sustaining battery plate of copper oxide provided with an improved surface layer of copper in accordance with the invention;

Fig. 2 is a sectional view taken on line 2—2 of Fig. 1;

Fig. 3 is a view in side elevation partly in section and partly broken away, of a basket type of negative electrode element wherein the copper oxide depolarizing mass is provided with an improved outer surface layer of copper in accordance with the invention;

Fig. 4 is a sectional view taken on line 4—4 of Fig. 3;

Fig. 5 is a view in side elevation, partly broken away, of another basket type of negative electrode element wherein each small body or granule of the mass of copper oxide in the perforated container is provided with a surface coating of copper in accordance with the invention;

Fig. 6 is a sectional view taken on line 6—6 of Fig. 5;

Fig. 7 is an enlarged sectional view of one of the small bodies or granules which make up the mass of copper oxide of the element shown in Figs. 5 and 6; and Fig. 8 is a somewhat diagrammatic and part sectional view of apparatus adapted to be used for carrying out certain steps of one method of procedure in accordance with the invention.

Referring to Figs. 1 and 2 of the drawings, reference character I designates a self-sustaining battery member or plate of copper oxide which is generally rectangular in form and has beveled edge portions, being of the type used to a great extent for the negative electrode elements in primary batteries of a well known make. Such self-sustaining members, can be, and as a matter of fact are, made in other forms as, for example, in the form of cylinders and flat circular plates. Plates of this character are usually made by molding finely divided copper oxide under a high pressure to the desired form, and then agglomerating the finely divided copper oxide to harden the plates and render them self-sustaining as by baking the same at a high temperature. The main body portion of the plate I shown consists of a mass 2 of the agglomerated copper oxide and a substantially homogeneous and uninterrupted surface layer 3 of metallic copper which is of substantially uniform thickness and produced in situ by subjecting all portions of the surface of the plate for a sufficient length of time to the action of a reducing gas. This reduction may be effected either by passing the copper oxide plate through the reducing area or zone of a gas flame or by disposing the plate in a heated furnace or oven in which a reducing atmosphere is maintained. The copper coating thus produced on a plate or other self-sustaining member of copper oxide while substantially homogeneous and free from unreduced particles of copper oxide and from moisture and harmful acid or alkaline salts, is of the same rather soft and powdery nature as the underlying copper oxide and is likely to brush or dust off to a considerable extent with handling. I have found that if instead of permitting such a plate or member to cool slowly to room temperature after it has been subjected to the heated reducing gas or atmosphere, the same is cooled very suddenly, as by immersing the same while still hot in a comparatively cold liquid bath, such for example, as a water bath, the character of the outer copper coating or layer is greatly improved and it becomes tenaciously bound to the underlying copper oxide. By this treatment the copper coating is rendered harder, more compact, and somewhat less porous than the underlying body of copper oxide. These results are due to the facts that the hot particles of copper in the coating upon being thus suddenly cooled, shrink and agglomerate to some extent so as to form small bodies of copper which are of greater size, more compact and in a state of greater coalescence than the particles of the underlying mass of copper oxide, and that the coating as a whole is also shrunk into tight binding engagement with the underlying copper oxide mass.

Where the negative electrode elements comprise self-sustaining plates or cylinders of copper oxide, the method of producing such plates or cylinders, or at least certain steps in such method, and the method of providing the plates or cylinders with the improved outer surface layers or coatings of metallic copper may be very advantageously combined in a single method, some at least of the steps of which are susceptible of being carried out successively and continuously. This combined method consists essentially in molding finely divided copper oxide under high pressure into plates or other mmebers of desired form, then baking the molded members at a high temperature, namely anywhere from about 1250° F. to about 1750° F., to agglomerate and harden the same, subjecting the agglomerated copper oxide members while still very hot from the baking operation to a reducing gas or atmosphere for a period sufficient to provide the same with surface layers or coatings of metallic copper of the desired thickness, and finally cooling the said members.

One form of apparatus whereby the combined method just described, or at least some of the steps thereof, may be continuously carried on is shown in Fig. 8. This apparatus comprises three compartments, 4, 5 and 6, provided in a suitable structure 7 which is supported on a base or foundation 7'. Openings 8 and 9 are respectively provided in the lower portions of the partitions separating the adjacent compartments 4, 5 and 5, 6 whereby communication is established between such compartments. Similar openings 10 and 11 are provided in the outer end walls of the compartments 4 and 6. Openings 8, 9, 10 and 11 are horizontally aligned, and an endless belt 12 formed of heat-resistant metal or other suitable heat-resistant flexible material, is mounted on spaced rollers 13 and 14 with its upper horizontal run or stretch extending through said openings and the compartments 4, 5 and 6. The rollers or pulleys 13 and 14 are mounted on suitable standards 15, 16 carried by the base 7'. The belt 12 is driven at a slow speed by any suitable source of power (not shown) connected with one of the pulleys 13, 14. To prevent the upper run of the belt 12 from sagging, a plurality of freely rotatable spaced similar rollers 17 are disposed directly beneath said run and bear on the plane upper surface of a long member 18 which is supported on the floor 19 of the compartments 4, 5 and 6 and extends through all of the openings 8, 9, 10 and 11. The rollers 17 while mounted for free rotary movement, are suitably held against movement in the direction of the length of member 18.

In the apparatus just described, the compartment 4 constitutes a baking chamber or zone which, under normal operating conditions, is preferably maintained at a temperature of from about 1650° F. to about 1750° F.; the compartment 5 constitutes a reducing chamber or zone which is normally kept filled with a suitable reducing gas or atmosphere and which need not be and preferably is not heated except by the hot baked copper oxide members in passing therethrough and by heat which may be otherwise transmitted thereto from the baking chamber 4; and compartment 6 is a cooling chamber or zone wherein a properly regulated and preferably neutral or non-oxidizing cooling medium, is normally maintained to effect the cooling of the copper oxide plates or members to the desired temperature in their passage therethrough from the reducing chamber or zone 5.

In the production of self-sustaining copper oxide members having surface layers or coatings of metallic copper of the desired characteristics, pursuant to the combined method described above and involving the use of the apparatus shown in Fig. 8, the procedure is preferably as follows: Finely divided copper oxide is first molded under high pressure into plates, cylinders or members of any other desired form, after which, if this is desirable, the molded members may be dried. The molded members are then placed on that portion of the upper run of belt 12 about to enter the baking chamber or zone 4 and are carried by the belt successively through the baking, reducing and cooling zones or chambers 4, 5 and 6. The speed at which the belt 12 is driven, the length of the chambers 4, 5 and 6 and the conditions maintained in said chambers are such that the said members will in their passage from the opening 10 to the opening 11 of the structure 7, first be baked so as to properly agglomerate and harden the copper oxide, will then be provided with substantially homogeneous surface layers or coatings of metallic copper of desired and substantially uniform thickness, and will finally be cooled to the desired temperature.

Fig. 8 shows a plurality of copper oxide plates 1 mounted on the upper run of belt 12 being carried thereby through the chambers of structure 7. After emerging from the cooling chamber or zone 6 the copper oxide plates may, if desired, be immersed in or treated with unheated cooling liquid, such as water at ordinary room temperature, to improve the character of the copper coating thereon and the adherence of such coating to the underlying copper oxide as described above. After such treatment the plates should of course be dried to eliminate all moisture. The copper coated plates produced as just described may, however, be advantageously subjected to the liquid or water cooling treatment immediately after they have been subjected to the reducing atmosphere in compartment 5. This results in considerably shortening the time required in carrying out the method and also enables the cooling chamber or zone 6 of the apparatus shown in Fig. 8 to be eliminated. The water or other cooling liquid used when the method is so modified, however, should not be cold enough to result in shattering or cracking the plates, which are still very hot when they emerge from the reducing chamber or zone 5. I have found that if under such circumstances, hot water is employed as the cooling medium, such cracking or shattering of the plates is largely eliminated and that best results are obtained when the water is heated substantially to the boiling point.

In the combined method above described it is necessary to use but a single heated oven or furnace, whereas if the copper oxide plates or members are agglomerated and hardened by baking and permitted to cool before the surfaces thereof are reduced to metallic copper by my improved dry gas reduction process, the use of two heated ovens or furnaces is required.

The basket form of negative battery electrode element 20 shown in Figs. 3 and 4, comprises a rectangular metallic container 21 having perforated side and bottom walls and imperforate end walls, and a mass 22 of finely divided copper oxide tightly packed, as by tamping, in the container. The side and bottom walls of the container are lined with asbestos paper 23 or other suitable porous and heat resistant material to prevent the escape of the fine particles of copper oxide through the perforations in said walls. A conductive metal sheet or thin plate 24 but slightly less in area than one of the side walls of the container, is imbedded in the mass of copper oxide supported from and electrically connected to said walls substantially midway between and parallel to said walls and is supported from and electrically connected to the latter, by conductive shouldered rivets 25 and spacing sleeves 26. Sheet 24 is, of course, secured in position before introduction of the copper oxide into the container. Container 21 has a flanged cover 27 which is suitably secured to the end walls of the container as by rivets 28. A spacing block 29 formed of suitable insulating material is supported from the cover 27 at a slight distance below the same by a stirrup 30, and extends through and projects beyond each of the side walls of the container. A conductive supporting rod 31 having its lower end threaded is secured to the cover 27 centrally thereof by nuts 32. Reference character 33 designates the outer surface layer of metallic copper with which the compacted mass 22 of copper oxide is provided in accordance with the invention.

That form of electrode element 40 shown in Figs. 5 and 6 comprises a finely perforated cylindrical container 41 formed of suitable conductive sheet metal and having its lower end closed by a suitable metallic cap 42, and a loose mass 43 of small bodies or granules of copper oxide disposed in and filling said container. The upper end of the container 41 is closed by a metallic cap 44 to which is secured a conductive supporting rod 45. The granules of copper oxide making up the mass 43, are of sufficient size (preferably being at least as large as the perforations in the container 41) to prevent their ready escape from the container through said perforations. Each of the said copper oxide granules 46, referring now to Fig. 7, comprises a main body portion 47 of copper oxide and a surface layer 48 of metallic copper in accordance with the invention, completely covering said body portion.

The conductive surface layers or coatings on the compacted mass of depolarizing material in that type of electrode element shown in Figs. 3 and 4 and on each of the small bodies or granules of depolarizing material in that type of electrode element shown in Figs. 5 and 6, are produced in accordance with the invention either by subjecting said elements to the reducing area or zone of a gas flame or by maintaining the elements for a sufficient period in a heated oven or furnace having an atmosphere of a suitable reducing gas such as hydrogen. The latter method produces the better results and it is this method I preferably employ. The conductive and protective coatings on the depolarizing oxide material thus obtained are substantially homogeneous in character and free from particles of unreduced oxide. While electrode elements of these types may after being subjected to the action of the reducing gas, be cooled slowly to room temperature, such elements while still hot from the reducing operation are preferably subjected to quick cooling or quenching substantially in the same manner as described above in connection with self-sustaining copper oxide plates of the type shown in Figs. 1 and 2. By this quick cooling the conductive coatings on the compacted masses of oxide material or on the individual granules or small bodies of the loose masses of oxide material, as the case may be, are somewhat hardened and compacted and otherwise improved and are also more firmly bound to the underlying oxide material in the same manner and for the same reasons as set forth above in connection with self-sustaining copper oxide plates.

By my improved dry gas reduction method herein described, the outer surface portions of battery depolarizing members, masses or bodies formed of metal oxide, may be very effectively and quickly reduced in situ to provide conductive and protective surface layers or coatings of any desired thickness. Where the depolarizing material is in the form of an agglomerated self-sustaining member, as in the battery electrode element shown in Figs. 1 and 2, or in the form of a compact mass of finely divided metal oxide, as in the case of the electrode element shown in Figs. 3 and 4, and such an element is exposed to a reducing gas or atmosphere, the reduction of the metal oxide starts at the outer surface of the self-sustaining member or of the compacted mass of finely divided oxide material, considered as a whole, and progresses inwardly; and where the depolarizing material is in the form of a loose mass of small bodies or granules, as in the electrode element shown in Figs. 5 and 6, and such element is exposed to the reduced gas or atmosphere, the latter at once penetrates and permeates the said loose mass and the reduction of the metal oxide starts at the outer surface of each of the individual granules of the mass and progresses inwardly thereof.

The speed at which the conductive and protective coatings are produced on depolarizing oxide material by my dry gas reduction method is dependent upon a number of things, such as the thickness of the coatings, the composition of the depolarizing material, the heat at which the reduction is carried on, and the nature and density of the reducing gas. For example in the case of electrode elements for primary batteries of the type hereinbefore described and comprising self-sustaining members of agglomerated finely divided copper oxide, it is desirable to provide such members with copper surface layers or coatings having a thickness of from 1/64 to 1/32 of an inch, and such coatings can be obtained by the said gas reduction in about 1½ minutes if the same is carried on at a temperature of approximately 1200° F. in a free or uncompressed atmosphere of hydrogen.

I claim:

1. The method which consists in molding a depolarizing electrode member for galvanic cells from a mass of finely divided material consisting principally of metal oxide as the depolarizing substance, subjecting the molded member to a baking temperature to agglomerate and harden the same, and thereafter and while the member is still hot from the baking operation, subjecting such member to the action of a reducing atmosphere.

2. The method of treating galvanic cell depolarizing material comprising a body consisting principally of metal oxide, which consists in subjecting said body under heat to the action of a dry reducing gas only until said body is provided with a comparatively thin surface layer of metal, and thereafter and while the surface of said body is still hot subjecting said surface to a comparatively cool fluid.

3. The method which consists in maintaining a galvanic cell electrode element comprising a compact mass of finely divided material consisting principally of metal oxide as the depolarizing substance for the cell, in a reducing atmosphere under heat until there is produced on such mass a surface layer of metal of desired thickness, and then removing such element from said reducing atmosphere and while the same is still hot subjecting the surface of said mass to a neutral or non-oxiding cooling medium.

4. The method which consists in molding a galvanic cell electrode member from a mass of finely divided material consisting principally of copper oxide, baking the molded member at a temperature of from about 1250° F. to about 1750° F. to agglomerate and harden the same, then subjecting the member while still hot from the baking operation to the action of a reducing atmosphere only until there is produced thereon a comparatively thin surface layer of metallic copper, and then removing said member from the reducing atmosphere and subjecting the surface thereof while still hot to a neutral or non-oxidizing and comparatively cool fluid.

5. The method which consists in molding a galvanic cell electrode member from a mass of finely divided material consisting principally of metal oxide, subjecting the molded member to a baking temperature to agglomerate and harden the same, and thereafter and while said member is still hot from the baking operation subjecting substantially the entire surface thereof under heat to the action of a reducing gas.

6. A galvanic cell electrode element comprising a body consisting principally of chemical depolarizing material for such cell, said material being metal oxide, the surface layer of said body consisting for the most part of metal produced in situ from said oxide by subjection of the latter to a reducing atmosphere.

7. A galvanic cell electrode element comprising a compact mass consisting principally of chemical depolarizing material for such cell, said material being metal oxide, the surface portion of said mass which is to be disposed in cooperative relation to active positive material of the cell consisting for the most part of metal produced in situ from said oxide by subjection of the latter to a reducing atmosphere.

8. A galvanic cell electrode element comprising a two-sided body consisting principally of chemical depolarizing material for such cell, said material being metal oxide, said element being designed to be disposed in such a cell between two positive electrode elements and with the two sides of said body respectively in opposed spaced relation to said positive elements, each of said sides having at least a major surface portion thereof formed of a continuous but substantially homogeneous layer of metal produced in situ from said oxide by subjection of the latter to a reducing atmosphere.

9. A galvanic cell electrode element comprising a self-sustaining agglomerated mass consisting principally of chemical depolarizing material for such cell, said material being metal oxide, the surface portion of said mass which is to be disposed in cooperative relation to positive active material of the cell consisting for the most part of metal produced in situ from said oxide by subjection of the latter to a reducing atmosphere.

10. A galvanic cell electrode element comprising a self-sustaining plate consisting principally of chemical depolarizing material for such cell, said material being copper oxide, the surface portion of each side of said plate consisting for the most part of copper produced in situ from said oxide by subjection of the latter to a reducing atmosphere.

11. A galvanic cell electrode element comprising a loose mass of small bodies or granules consisting principally of chemical depolarizing material for such cell, said material being metal oxide, the surface layer of each of said granules consisting for the most part of metal produced in situ from said oxide by subjection of the granules to a reducing atmosphere.

12. A galvanic cell electrode element comprising a perforated container of conductive material and a compact mass of finely divided material consisting principally of a chemical depolarizing substance for such cell, said substance being metal oxide, said mass being disposed in said container with the major surface portion thereof adjacent the walls of the container, said surface portion consisting for the most part of metal produced in situ from said oxide by subjection of said mass to a reducing atmosphere.

13. A galvanic cell electrode element comprising a perforated container of conductive material having therein and in contact with wall portions thereof a loose mass of small bodies or granules consisting principally of chemical depolarizing material for such cell, said material being metal oxide, the surface portion of each of said granules consisting for the most part of metal produced in situ from said oxide by subjecting the granules to a reducing atmosphere.

14. A galvanic cell electrode element comprising a body consisting principally of chemical depolarizing material for such cell, said material being metal oxide, the major surface portion of said body consisting of a substantially continuous homogeneous layer of metal produced in situ from said body by subjection of the latter to a reducing atmosphere, the metal particles of said layer being in a state of greater coalescence than those of the underlying oxide.

15. A galvanic cell electrode element comprising a body consisting principally of chemical depolarizing material for such cell; said material being oxide of one of the metals copper, nickel, manganese and lead; the surface portion of said body consisting for the most part of metal produced in situ from said oxide by subjection of the latter to a reducing atmosphere.

16. A galvanic cell electrode element comprising a body consisting principally of copper oxide as chemical depolarizing material for such cell, the surface layer of said body consisting for the most part of metallic copper produced in situ from said oxide by subjection of the latter to a reducing atmosphere.

17. A galvanic cell electrode element comprising a self-sustaining agglomerated mass consisting principally of chemical depolarizing material for such cell, said material being copper oxide, said mass having a surface layer of copper produced in situ therefrom by subjection thereof to a reducing atmosphere, said layer being characterized in that it comprises copper particle agglomerates which are of greater size and more compact than the particles of the underlying copper oxide.

18. A galvanic cell electrode element comprising a mass consisting principally of chemical depolarizing material for such cell, said material being metal oxide, said mass having a surface layer consisting principally of said metal produced in situ from the said oxide of such mass by subjection of the latter to a reducing atmosphere, the said layer being characterized in that it is shrunk into binding engagement with the underlying material of said mass.

19. The method of treating a galvanic cell depolarizing element comprising a body consisting principally of metal oxide as the depolarizing material, which consists in subjecting said body under heat to the action of a dry reducing gas only until such body is provided with a comparatively thin surface layer of metal, and then rapidly cooling the heated surface layer of said body.

ALBERT I. EDDY.

CERTIFICATE OF CORRECTION.

Patent No. 2,157,072.                                                                 May 2, 1939.

ALBERT I. EDDY.

It is hereby certified that error appears in the printed specification of the above numbered patent requiring correction as follows: Page 1, second column, line 29, for "electrolye" read electrolyte; page 2, first column, line 39, for "cooper" read copper; page 3, second column, line 46, for "mmebers" read members; page 4, second column, line 38-39, strike out the words "supported from and electrically connected to said walls"; page 5, first column, line 62, for "reduced" read reducing; and that the said Letters Patent should be read with this correction therein that the same may conform to the record of the case in the Patent Office.

Signed and sealed this 27th day of June, A. D. 1939.

(Seal)
                                                                    Henry Van Arsdale
                                                                 Acting Commissioner of Patents.